Sept. 16, 1930.   L. L. CUSTER   1,775,988

SAFETY RETAINING MEANS

Filed Jan. 2, 1929   3 Sheets-Sheet 1

INVENTOR
LEVITT L. CUSTER.

BY Toulmin & Toulmin
ATTORNEYS

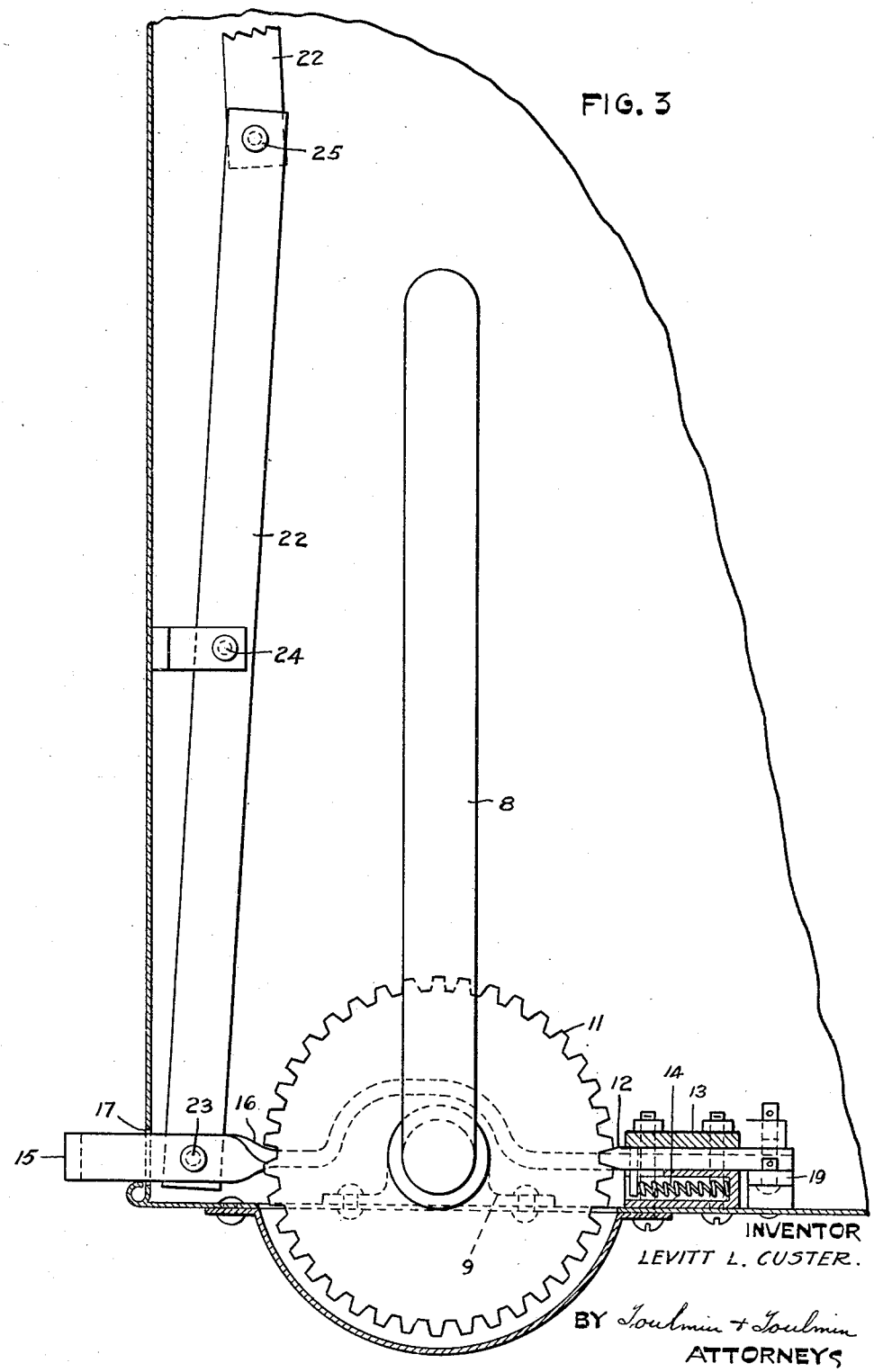

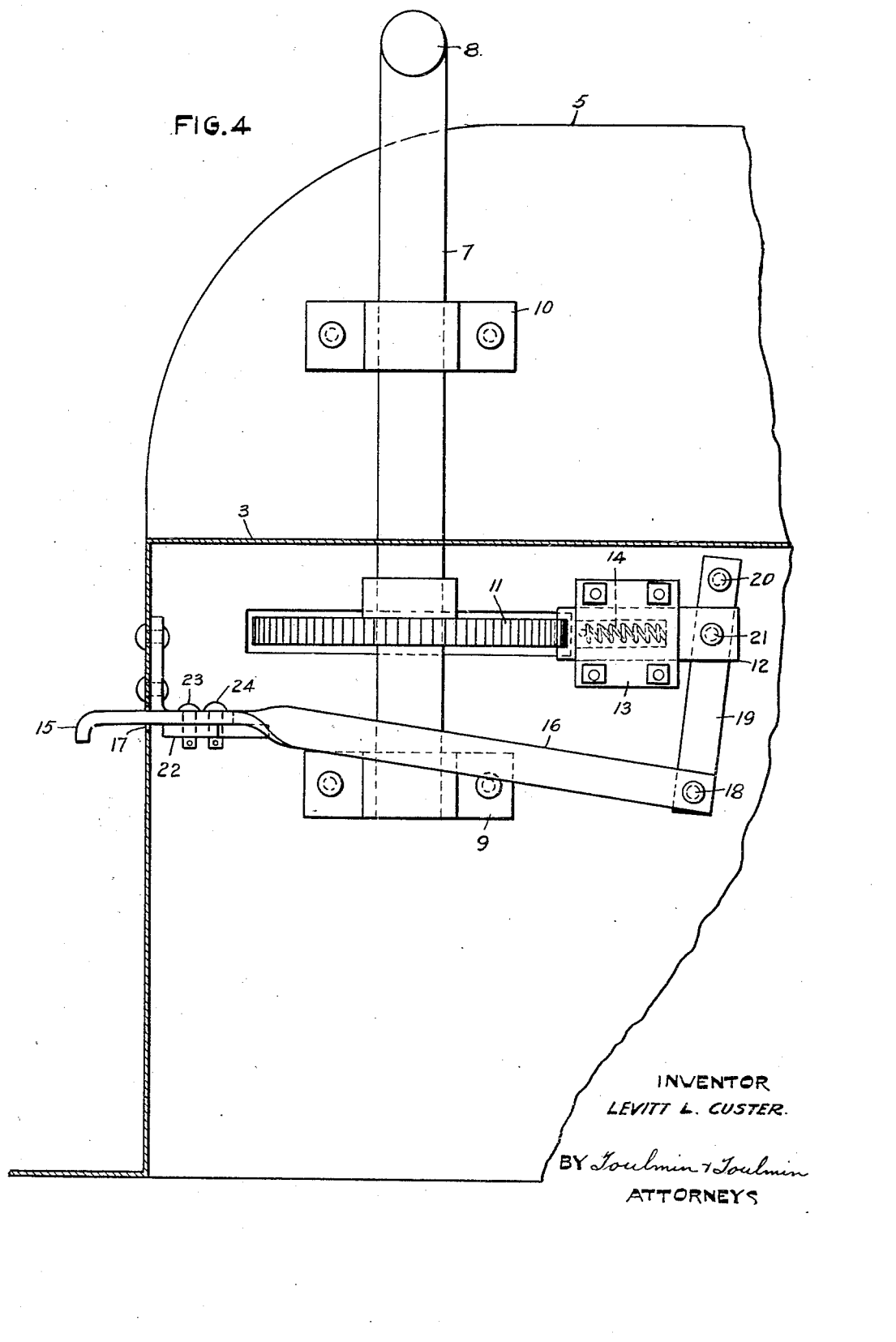

Patented Sept. 16, 1930

1,775,988

UNITED STATES PATENT OFFICE

LEVITT L. CUSTER, OF DAYTON, OHIO

SAFETY RETAINING MEANS

Application filed January 2, 1929. Serial No. 329,797.

This invention relates to safety retaining means adapted to be used in connection with cars on merry-go-rounds, Ferris wheels, scenic railways, loop-the-loops and aviator cars used in imitation of airplanes.

It is more particularly the object of this invention to provide a safety retaining means attached to each side of the car and adapted to be rotated so that the passenger, when boarding or leaving the car, may use the safety retaining means as a hand hold for assistance in getting on or off the car.

This invention also relates to means for so locking the safety means when the passenger is seated in the car that the passenger is held in the car in such a way that there is little or no danger of being thrown from the car, and the locking means is so placed that the passenger cannot reach it without difficulty, and cannot release it in case of fright when the car is in motion. It is adjustable to any size person.

For the purpose of illustration there is shown in the accompanying drawings a preferred embodiment of this invention.

Referring to the drawings:

Figure 3 is a plan view of the retaining means and a section of part of the car body.

Figure 4 is a side elevation of the retaining means and a section of the adjacent part of the car.

Figure 1:
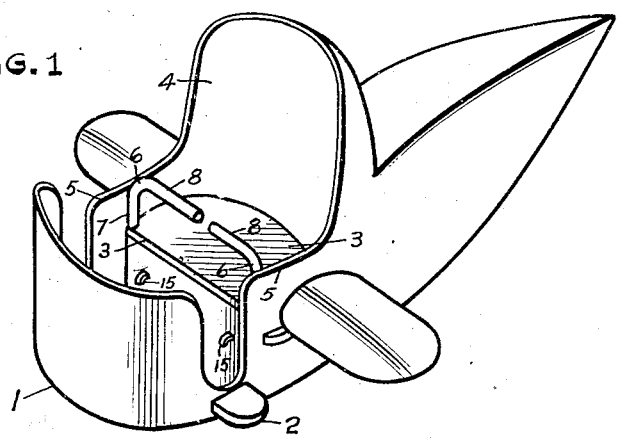
Figure 1 is a perspective view of the car to which this retaining means is attached.
Figure 2:
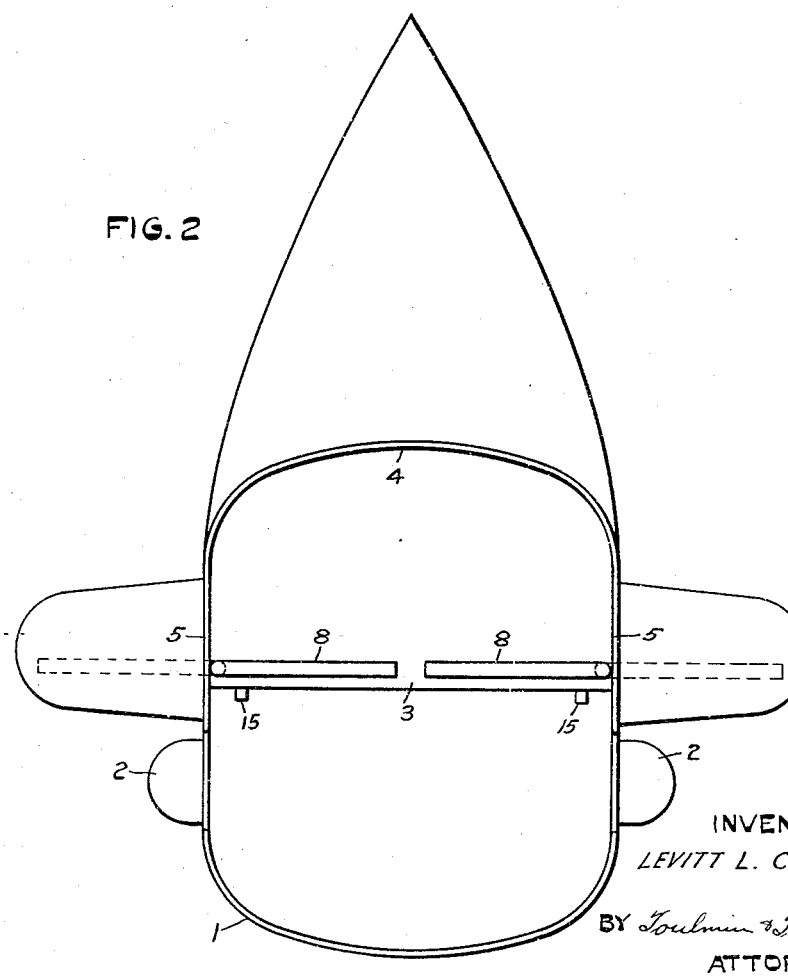
Figure 2 is a plan view of the car, showing the retaining means.

The car as a whole is indicated by the numeral 1, and is such a car as is usually found in merry-go-rounds, Ferris wheels and the like at amusement parks. On each side of the car is found a step 2 upon which the passenger steps as he enters the car. The seat of the car is indicated by the numeral 3 and has a back 4, usually found in cars of this type. At each end of the seat there is the usual end piece 5, near which the safety or retaining means is located.

The safety or retaining means is in the form of a bar 6, which has a vertical part 7 and a horizontal part 8. This bar is supported in the car by means of a plate 9 attached to the side of the car, serving as a bearing plate for the lower end of the bar. Near the upper part of the end of the seat is located another bearing plate 10. These plates are arranged sufficiently far apart that the bar is held in substantially rigid upright position, allowing only for the rotation of the bar.

Between these two plates there is located a ratchet wheel 11. This ratchet wheel is rigidly secured to the vertical part of the bar in any suitable manner, and rotates with the bar when the bar is operated for letting passengers on or off the car. This ratchet wheel is held in different positions by means of a pawl 12, which is located in a housing 13. The housing 13 is suitably attached to the body of the car and in connection with the spring 14 holds the pawl in engagement with the ratchet wheel, except when released by means of a lever for that purpose.

The numeral 15 indicates a push button on the end of a bar 16, which is suitably guided in a guide means 17. The end of the bar 16, remote from the push button, is pivotally attached at the point 18 to one end of a link 19. The other end of the link 19 is pivoted to the body of the car, as indicated by the numeral 20. Between the ends of this link the outer end of the pawl 12 is pivoted at a point indicated by the numeral 21.

When it is desired to release the pawl 12 from the ratchet wheel the button 15 is pushed to operate the link 19 to remove the pawl 12 from the ratchet wheel. At this time the safety bar can be rotated to any position desired. When in the position shown in Figure 1 the bar is used for safety purposes, but when in reverse position from that shown in Figure 1 the bar is used as a hand hold or rail to assist the passengers in entering and leaving the car. There is one of these devices on each side of the car and for each passenger seated in the car, the car being adapted to accommodate two passengers.

For the purpose of convenience in locking and unlocking the safety bars they may be united by a lever mechanism shown partly in Figure 3. These levers, two of them, are indicated by the numeral 22. One end of each lever is pivoted at 23 to the outer end of the bar 16, and near its center 24 it is pivoted to the front under side of the seat of the car. Near the center of the seat these two bars are attached together at the other end so as to have a pivotal motion one with the other, as at 25. By this means pushing the push button 15 will release both of the safety bars and allow them to swing open at the same time.

If it should be desired to operate the bars separately the levers 22 may be omitted. In that event each push button will operate independently of the other, but when the levers 22 are used each side of the car may be released by pushing on one push button. This will save trouble and the time of the operator since the push buttons are not intended to be used by the passengers, and are located at a point substantially out of reach of the passenger so that the passenger, in case of fright or panic cannot reach the button to release the bars and endanger the passenger.

These safety bars in this arrangement may be adjusted so as to accommodate themselves to large persons, slender persons or even children, and when adjusted are safe and reliable and cannot be moved until the push button has been pushed for the purpose of releasing the pawl from the ratchet wheel.

I desire to comprehend within my invention such modifications as may be clearly embraced within my claims and the scope of my invention.

Having thus fully described my invention, what I claim is new and desire to secure by Letters Patent, is:

1. In a car having a seat, a bar rotatably mounted adjacent each end of said seat and adapted to be set in different positions to hold persons in the seat, and jointly operated means to hold said bars in any one of said different positions.

2. In a car having a seat, a bar rotatably mounted adjacent each end of said seat and adapted to be set in different positions to hold persons in the seat, and jointly operated pawl and ratchet means to hold said bars in any one of said different positions.

3. In a car having a seat, a bar having a horizontal arm rotatably mounted at each end of the seat and adapted to be set in different positions to hold persons in the seat, and jointly operated means to hold said bars in any one of said different positions.

4. In a car having a seat, a bar having a horizontal arm rotatably mounted at each end of the seat and adapted to be set in different positions to hold persons in the seat, and jointly operated pawl and ratchet means to hold said bars in any one of said different positions.

5. In a car, in combination with a seat and side steps, a safety bar having a horizontal part rotatably mounted on each side of the car adjacent the seat and steps, said bar adapted in one position to cooperate with the seat to hold passengers in the car and in another position to cooperate with the steps to form a safe entrance to the car, means to hold the bars in each position, and a common means for releasing said holding means.

6. In a car, in combination with a seat and side steps, a safety bar having a horizontal part rotatably mounted on each side of the car adjacent the seat and steps, said bar adapted in one position to cooperate with the seat to hold passengers in the car and in another position to cooperate with the steps to form a safe entrance to the car, pawl and ratchet means to hold the bars in each position, and a common means for releasing said holding means.

7. In a car, in combination with a seat and side steps, a safety bar rotatably mounted on each side of the car adjacent a step to swing in a horizontal plane, a ratchet wheel on each bar, means to engage each wheel to lock the bar against rotation, and means operable from either side of the car to release said means to permit the rotation of said bars.

8. In a car, in combination with a seat and side steps, a safety bar rotatably mounted on each side of the car adjacent a step to swing in a horizontal plane, a ratchet wheel on each bar, a pawl to engage each wheel to lock the bar against turning, and means attached to the pawls and operable from each side of the car to release said pawls to rotate the bars.

9. In a car, in combination with a seat and side steps, a safety bar rotatably mounted on each side of the car adjacent a step to swing in a horizontal plane, a ratchet wheel on each bar, a pawl to engage each wheel to lock the bar against turning, and lever means attached to the pawls and operable from each side of the car to release said pawls to rotate the bars.

In testimony whereof, I affix my signature.

LEVITT L. CUSTER.